US008253674B2

(12) United States Patent
Makino et al.

(10) Patent No.: US 8,253,674 B2
(45) Date of Patent: Aug. 28, 2012

(54) DRIVE METHOD FOR LIQUID CRYSTAL DISPLAY DEVICE AND LIQUID CRYSTAL DISPLAY DEVICE

(75) Inventors: Tetsuya Makino, Kakogawa (JP); Toshiaki Yoshihara, Kawasaki (JP); Shinji Tadaki, Kawasaki (JP); Hironori Shiroto, Kobe (JP); Yoshinori Kiyota, Kawasaki (JP); Keiichi Betsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 736 days.

(21) Appl. No.: 11/899,493

(22) Filed: Sep. 6, 2007

(65) Prior Publication Data

US 2008/0001878 A1 Jan. 3, 2008

Related U.S. Application Data

(63) Continuation of application No. PCT/JP2005/004346, filed on Mar. 11, 2005.

(51) Int. Cl.
*G09G 3/36* (2006.01)
*G02F 1/133* (2006.01)

(52) U.S. Cl. ................ 345/94; 345/87; 345/89; 349/19; 349/33

(58) Field of Classification Search ............ 345/87–104; 349/19, 33
See application file for complete search history.

(56) References Cited

U.S. PATENT DOCUMENTS

| | | | | |
|---|---|---|---|---|
| 4,795,239 | A | 1/1989 | Yamashita et al. | |
| 6,016,133 | A * | 1/2000 | Nito et al. | 345/89 |
| 7,663,590 | B2 * | 2/2010 | Okazaki | 345/96 |
| 2001/0035852 | A1 * | 11/2001 | Yoshihara et al. | 345/87 |
| 2002/0084973 | A1 | 7/2002 | Choi et al. | |
| 2006/0164356 | A1 * | 7/2006 | Yang et al. | 345/89 |
| 2006/0250534 | A1 * | 11/2006 | Kutscher et al. | 349/41 |
| 2007/0211004 | A1 | 9/2007 | Yoshihara et al. | |

FOREIGN PATENT DOCUMENTS

| | | |
|---|---|---|
| JP | 62-49399 | 3/1987 |
| JP | 3-235989 | 10/1991 |
| JP | 03-243915 | 10/1991 |
| JP | 4-151121 | 5/1992 |

(Continued)

OTHER PUBLICATIONS

Office Action issued in JP 2007-506968, mailed Sep. 7, 2010 (partial translation).

English Translation of JP 6-35417 previously disclosed on Sep. 6, 2007.

*Primary Examiner* — Bipin Shalwala
*Assistant Examiner* — Ilana Spar
(74) *Attorney, Agent, or Firm* — Greer, Burns & Crain, Ltd.

(57) ABSTRACT

A liquid crystal panel includes a glass substrate with pixel electrodes that are arranged in a matrix shape, TFTs that are connected to the pixel electrodes, and a glass substrate with an opposing electrode and color filters that are arranged in a matrix shape. A liquid crystal layer is formed in a space between the glass substrates by filling a ferroelectric liquid crystal into the space. When writing display data, and when deleting display data that has been written, a voltage, not including 0V, that becomes a voltage potential, or in other words, a voltage that is greater than a threshold voltage at which the optical characteristic of the filled ferroelectric liquid crystal changes is applied between the opposing electrode and pixel electrodes. An image is displayed over all gradation numbers, including the low-gradation side, and the display characteristic is improved.

12 Claims, 15 Drawing Sheets

FOREIGN PATENT DOCUMENTS

| | | | | |
|---|---|---|---|---|
| JP | 06-035417 | | | 2/1994 |
| JP | 06035417 | A | * | 2/1994 |
| JP | 10-90697 | | | 4/1998 |
| JP | 2000-275620 | | | 10/2000 |
| JP | 2001-311934 | | | 11/2001 |
| JP | 2004219938 | A | * | 8/2004 |
| KR | 2002-0056007 | | | 7/2002 |
| KR | 20020056007 | | * | 7/2002 |

* cited by examiner

DRIVE METHOD FOR LIQUID CRYSTAL DISPLAY DEVICE AND LIQUID CRYSTAL DISPLAY DEVICE

This is a continuation filed under 35 U.S.C. §111(a), of PCT International Application No. PCT/JP2005/4346 filed Mar. 11, 2005, which designated the United States of America.

TECHNICAL FIELD

The present invention relates to a drive method for liquid crystal display device and a liquid crystal display device, and more particularly, to a drive method for liquid crystal display device and a liquid crystal display device in which a panel having switching elements for respective pixels includes liquid crystal material such as ferroelectric liquid crystal or anti-ferroelectric liquid crystal having spontaneous polarization.

BACKGROUND ART

Typically used TN (Twisted Nematic) liquid crystal has a response speed in response to applied voltage of 10 to several 10 ms, and the response speed between gradation displays having different gradation number rapidly increases and may approach 100 ms. Therefore, when performing a moving image display (60 images/second) on a liquid crystal display device that uses TN liquid crystal, the liquid crystal molecules do not completely operate and the image becomes unclear, so TN liquid crystal is not suitable for use in a multimedia moving image display.

Consequently, liquid crystal display devices that use ferroelectric liquid crystal or anti-ferroelectric liquid crystal which has spontaneous polarization and a response speed in response to applied voltage of several 10 to several 100 μs are being put into practical use. In the case of this kind of liquid crystal that is capable of a high response speed, the voltage that is applied to each pixel is controlled by a switching element such as a TFT (Thin Film Transistor) or MIM (Metal Insulator Metal), and by completing polarization of liquid crystal molecules in a short time, so an excellent moving-image display becomes possible.

Methods of driving an active-type liquid crystal panel that has a switching element such as a TFT or MIM and that includes ferroelectric liquid crystal or anti-ferroelectric liquid crystal have been proposed (for example, refer to patent documents 1 and 2). In these prior examples, the potential between opposing electrodes is normally taken to be 0V (ground voltage), and when writing display data, a voltage greater than 0V (ground voltage) is applied to the pixel electrodes, and when deleting display data, voltage, including 0V, which has polarity that is opposite that of the voltage applied during writing, is applied to the pixel electrodes. In this specification, an ideal system is explained in which the field-through voltage (ΔV) that is generated when the gate is OFF is not generated.

[Patent Document 1]

U.S. Pat. No. 2,681,528

[Patent Document 2]

U.S. Pat. No. 3,403,114

DISCLOSURE OF THE INVENTION

Problems to be Solved by the Invention

FIG. 13 is a graph showing the electro-optical characteristic (V-T characteristics) of liquid crystal material (typical ferroelectric liquid crystal or anti-ferroelectric liquid crystal). Besides 0V, there is typically a voltage (1.5V or less) at which the intensity of transmitted light becomes 0, in other words, there is a threshold voltage (1.5V). When using a liquid crystal material having this kind of electro-optical characteristic in a liquid crystal display device that uses a drive method that writes display data when a voltage greater than 0V is applied, and deletes display data when a voltage less than 0V is applied, a problem occurs in the gradation characteristic.

This problem will be explained in detail using patent document 1 as an example. With the potential between opposing electrodes taken to be 0V (ground voltage), then when a voltage, including 0V, is applied to pixel electrodes, it is necessary, as shown in FIG. 14, to set the output characteristics of the source driver so that an output voltage is obtained from 0V. In FIG. 14, characteristic B has a lower gradation number, and is capable of displaying more on the low-gradation side than characteristic A, and characteristic C has a high gradation number, and is capable of displaying more on the high-gradation side than characteristic A. In the example shown in FIG. 13, at a voltage of ±1.5V or less, the transmitted light intensity is 0. Therefore, in FIG. 14, the gradations at 1.5V or less are 0 to 19 gradations (of 64 gradations) in the case of characteristic A, are 0 to 27 gradations (of 64 gradations) in the case of characteristic B, and are 0 to 7 gradations (of 64 gradations) in the case of characteristic C. FIG. 15 is a graph showing the gradation characteristics (relationship between the number of input gradations and the intensity of transmitted light) in this case, and for any characteristic, the low-gradation side of the display device is black.

Taking the aforementioned problems into consideration, the object of the present invention is to provide a drive method for liquid crystal display device and a liquid crystal display device that make it possible to obtain a display device having excellent gradation characteristics by solving the problems that existed in the prior art and removing the gradation on the low-gradation side that cannot be displayed.

Means for Solving the Problems

The drive method for a liquid crystal display device of the present invention is a drive method for a liquid crystal display device that is formed by filling a liquid crystal material having spontaneous polarization between first electrodes that are formed on one substrate and a second electrode that is formed on another substrate, and that has switching elements on the one substrate that correspond to a plurality of pixels respectively and that control the voltage applied to the liquid crystal material; and the drive method driving the liquid crystal display device so that it writes display data according to voltage that is applied between the first electrodes and second electrode and that corresponds to the display data; wherein, when writing display data, a voltage except 0V that becomes a potential difference between the first electrodes and second electrode is applied.

In the drive method for a liquid crystal display device of the present invention, the voltage that is applied when writing display data is a voltage that is greater than a threshold voltage at which the electro-optical characteristic of the liquid crystal material changes.

When writing display data, the drive method for a liquid crystal display device of the present invention takes the second electrode to be at ground potential, and applies a voltage that is greater than the threshold voltage to the first electrodes.

When writing display data, the drive method for a liquid crystal display device of the present invention applies a voltage that is within a specified range to the first electrodes, and applies a fixed voltage that is set according to the specified range and the threshold voltage to the second electrode.

The drive method for a liquid crystal display device of the present invention is a drive method for a liquid crystal display device that is formed by filling a liquid crystal material having spontaneous polarization between first electrodes that are formed on one substrate and a second electrode that is formed on another substrate, and that has switching elements on the one substrate that correspond to a plurality of pixels respectively and that control the voltage applied to the liquid crystal material; and the drive method driving the liquid crystal display device so that it deletes display data according to voltage that is applied between the first electrodes and second electrode and that corresponds to the display data; wherein, when deleting display data, a voltage except 0V that becomes a potential difference between the first electrodes and second electrode is applied.

In the drive method for a liquid crystal display device of the present invention, the voltage that is applied when deleting display data is a voltage that is greater than a threshold voltage at which the electro-optical characteristic of the liquid crystal material changes.

When deleting display data, the drive method for a liquid crystal display of the present invention takes the second electrode to be at ground potential, and applies a voltage that is greater than the threshold voltage to the first electrodes.

When deleting display data, the drive method for a liquid crystal display device of the present invention applies a voltage that is within a specified range to the first electrodes, and applies a fixed voltage that is set according to the specified range and the threshold voltage to the second electrode.

The liquid crystal display device of the present invention is a liquid crystal display device that is formed by filling a liquid crystal material having spontaneous polarization between first electrodes that are formed on one substrate and a second electrode that is formed on another substrate, that has switching elements on the one substrate that correspond to a plurality of pixels respectively and that control the voltage applied to the liquid crystal material, and that writes display data according to voltage that is applied between the first electrodes and second electrode and that corresponds to the display data; wherein the liquid crystal display device comprises means for applying a voltage except 0V that becomes a potential difference between the first electrodes and second electrode when writing display data.

In the liquid crystal display device of the present invention, the voltage that is applied when writing display data is a voltage that is greater than a threshold voltage at which the electro-optical characteristic of the liquid crystal material changes.

The liquid crystal display device of the present invention is a liquid crystal display device that is formed by filling a liquid crystal material having spontaneous polarization between first electrodes that are formed on one substrate and a second electrode that is formed on another substrate, that has switching elements on the one substrate that correspond to a plurality of pixels respectively and that control the voltage applied to the liquid crystal material, and that deletes display data according to voltage that is applied between the first electrodes and second electrode and that corresponds to the display data; wherein the liquid crystal display device comprises means for applying a voltage except 0V that becomes a potential difference between the first electrodes and second electrode when deleting display data.

In the liquid crystal display device of the present invention, the voltage that is applied when deleting display data is a voltage that is greater than a threshold voltage at which the electro-optical characteristic of the liquid crystal material changes.

The liquid crystal display device of the present invention performs color display using a color filter method.

The liquid crystal display device of the present invention performs color display using a field sequential method.

In the present invention, when writing display data, and when deleting display data that has been written, a voltage, not including 0V, that becomes a potential difference, or in other words, a voltage that is greater than a threshold voltage at which the optical characteristic of the filled liquid crystal material changes, is applied between the opposing electrodes (first electrodes, second electrode). For example, when the liquid crystal material has electro-optical characteristics as shown in FIG. 13, a voltage of 1.5V or more is applied when writing display data, and a voltage of −1.5V or less is applied when deleting display data. As a result, an image is displayed on the low-gradation side as well, and the display characteristic is improved.

As a method of applying this kind of voltage, is a method of taking one electrode (second electrode) to be at ground potential and applying a voltage that is greater than a threshold voltage to the other electrodes (first electrodes), or a method of applying a voltage within a specified range to one electrode (first electrodes) and applying a fixed voltage that is set according to the specified range and threshold voltage to the other electrode (second electrode). In either method, processing for applying voltage can be performed easily.

The drive method of the present invention can be applied to either a color filter type liquid crystal display device that performs a color display using a white light source and color filters, or to a field sequential type liquid crystal display device that uses a color light source to perform a color display having high definition, high color purity and high-speed response.

Effects of the Invention

With the present invention, it is possible to eliminate gradation that cannot be displayed on the low-gradation side, so a liquid crystal display device having excellent gradation display characteristics is possible.

DESCRIPTION OF THE NUMERALS

Figure 1:
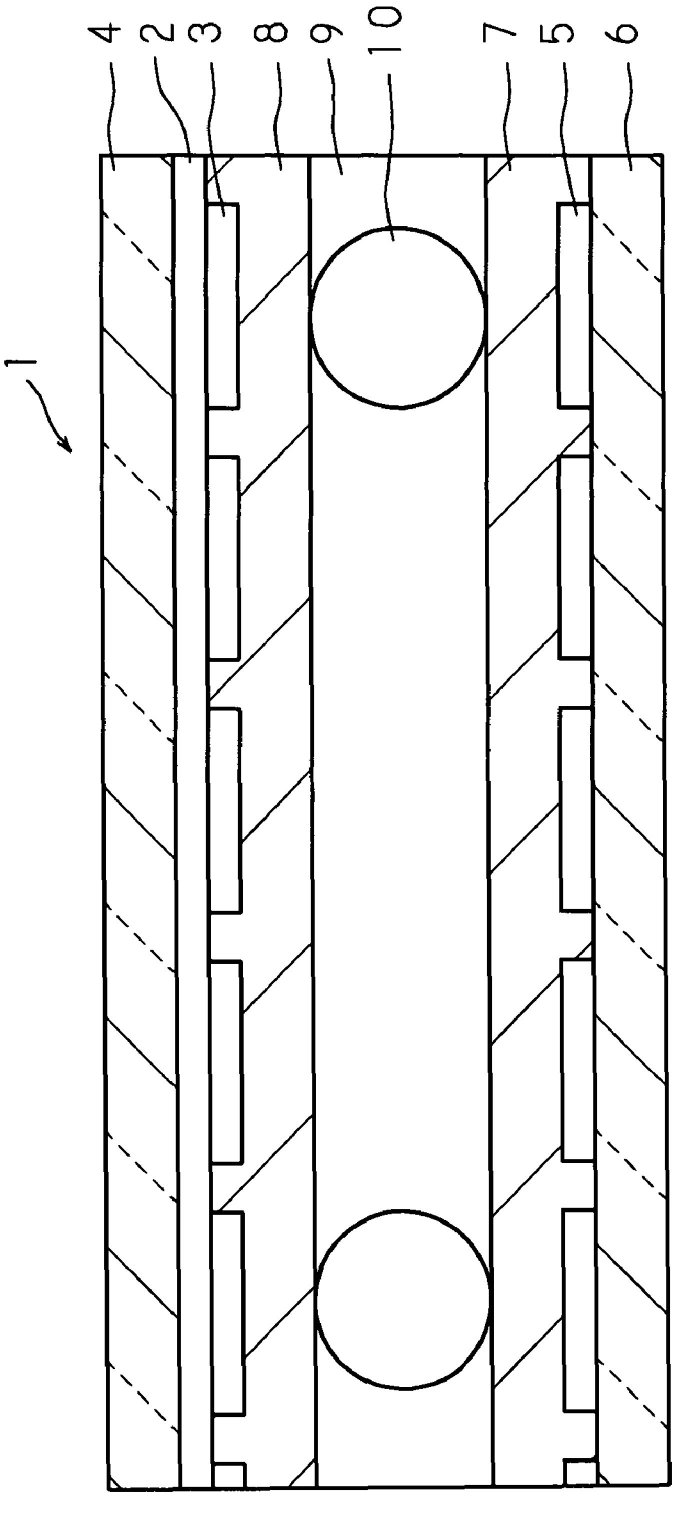
FIG. 1 is a cross-sectional drawing of a liquid crystal panel.

1 Liquid crystal panel
2 Opposing electrode (second electrode)
3 Color filter
4 Glass substrate
5 Pixel electrode (first electrode)
6 Glass substrate
9 Liquid crystal layer
21 TFT
22 Source driver
22*a* Gradation-voltage-generation circuit
24 Gate driver
26 Backlight
31 LCD control circuit
41 Gradation-reference-voltage-generation circuit

BEST MODES FOR IMPLEMENTING THE INVENTION

The preferred embodiments of the present invention will be explained in detail with reference to the drawings. The invention is not limited by the embodiments described below.

First Embodiment

FIG. 1 is a cross-sectional drawing showing the construction of a liquid crystal panel. As shown in FIG. 1, the liquid crystal panel 1 comprises: a glass substrate 6 having ITO (Indium Tin Oxide) pixel electrodes 5 having excellent light transmission capability and arranged in a matrix shape as first electrodes (for example, 0.08×0.24 mm2, 1024 H×3 RGB×768 V pixels, 12.1 inches diagonal) and TFTs that are connected to the pixel electrodes 5 respectively; and a glass substrate 4 having an opposing electrode 2 as a second electrode and color filters 3 that are arranged in a matrix shape.

Figure 2:
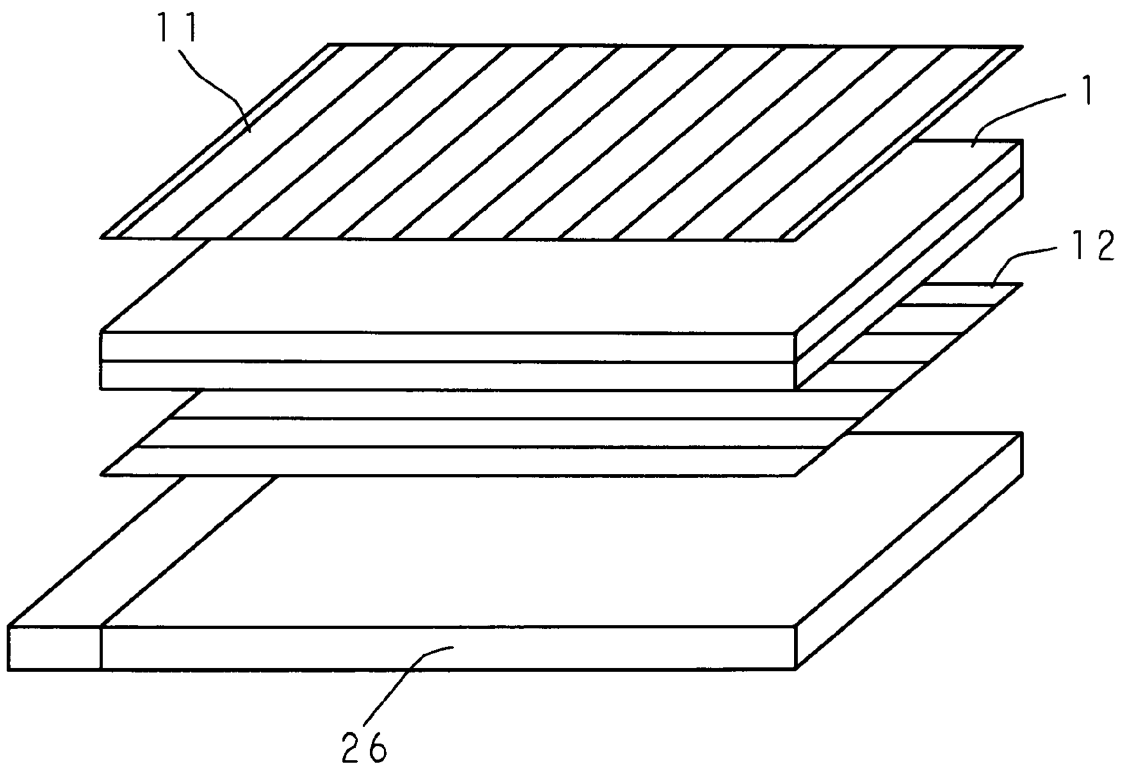
FIG. 2 is a pictorial drawing of a liquid crystal panel and backlight.

Oriented films 7 and 8 are located on top of the pixel electrodes 5 and color filters 3, and the glass substrate 6 and glass substrate 4 are arranged so that the oriented film 7 faces the oriented film 8. A liquid crystal layer 9 that is filled with ferroelectric liquid crystal is formed in a space that is formed by distributing spacers 10 (having a spherical, rectangular, cylindrical, shell shaped, inverse shell shaped or the like) for maintaining a uniform gap (for example, 1.6 μm) between the oriented film 7 and oriented film 8. As shown in FIG. 2, this liquid crystal panel 1 is held between two polarization plates, polarization plate 11 and polarization plate 12, under which there is a backlight 26 having a white light source.

Figure 3:
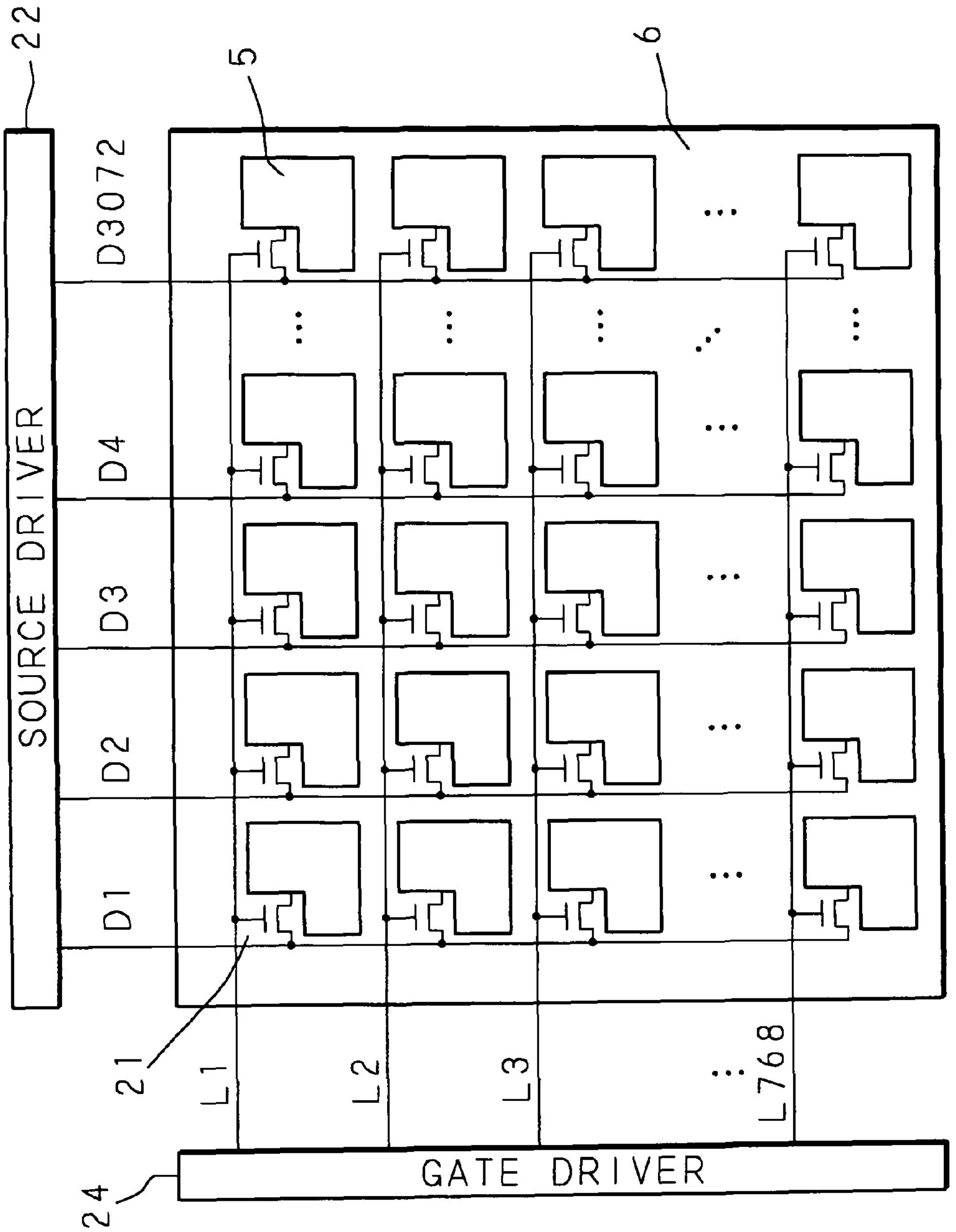
FIG. 3 is a top view of a liquid crystal panel.
Figure 4:
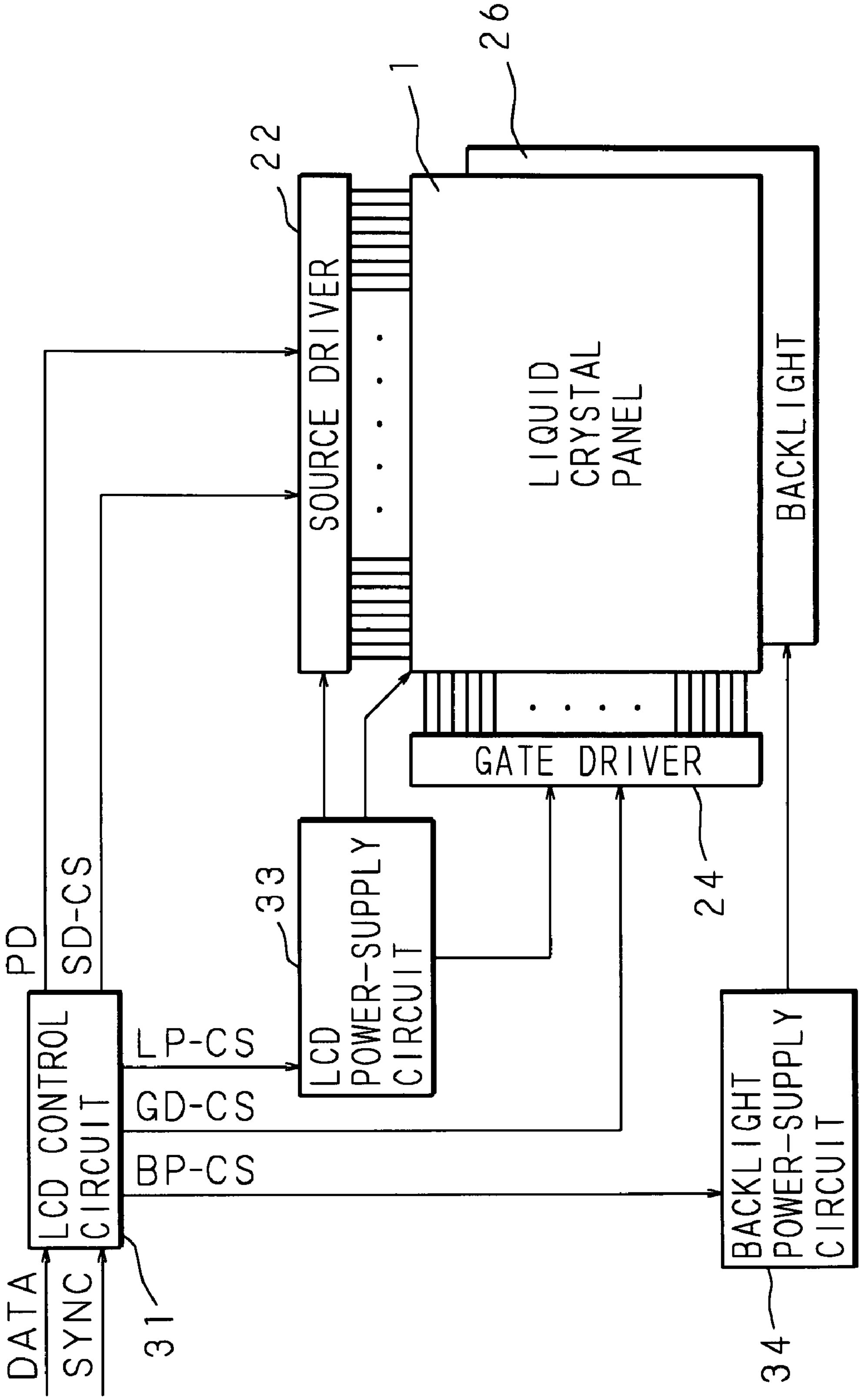
FIG. 4 is block diagram showing the overall construction of a liquid crystal display device.

FIG. 3 is a top view of a liquid crystal panel 1, and FIG. 4 is a block diagram showing the overall construction of a liquid crystal display device. As shown in FIG. 3, the pixel electrodes 5 and TFTs 21 are arranged in a matrix (for example, 1024 H×3 RGB×768 V) on the glass substrate 6, and each of the pixel electrodes 5 is connected to the drain terminal of each of the TFTs 21. The gate terminals of the TFTs 21 are connected to scan lines Li (i=1, 2, 3, . . . , 768), and the source terminals of the TFTs 21 are connected to data lines Dj (j=1, 2, 3, . . . , 3072). The scan lines Li are connected in order to the output stage of the gate drive 24, and the data lines Dj are connected in order to the output stage of the source driver 22.

The TFTs 21 are controlled to be ON or OFF by scan signals that are supplied in order of lines and inputted to the scan lines Li, and when ON, apply the data voltages that are inputted to each of the data lines from the source driver 22 to the pixel electrodes 5, and when OFF, maintain the data voltages up to that point. Also, the data voltages that are applied by way of the TFTs 21 control the light transmission of the liquid crystal, which is determined according to the electro-optical characteristic of the liquid crystal, and display an image.

As shown in FIG. 4, in addition to the source driver 22 and gate driver 24, the liquid crystal display device comprises peripheral circuits such as an LCD control circuit 31, LCD power-supply circuit 33, and backlight power-supply circuit 34.

From a synchronization signal SYNC that is inputted, the LCD control circuit 31 generates: a control signal SD-CS that is necessary for controlling the operation of the source driver 22; a control signal GD-CS that is necessary for controlling the operation of the gate driver 24; a control signal LP-CD that is necessary for controlling the LCD power-supply circuit 33; and a control signal BP-CS that is necessary for controlling the backlight power-supply circuit 34; and respectively outputs the generated control signals to the source driver 22, gate driver 24, LCD power-supply circuit 33 and backlight power-supply circuit 34.

Also, at the same time, the LCD control circuit 31, in synchronization with the inputted synchronization signal SYNC, obtains display data DATA that is inputted, and outputs image data PD that is to be displayed on the liquid crystal panel 1 to the source driver 22. The inputted display data DATA includes: the CRT output signal from a PC after A/D conversion; a signal that is restored by the DVI receiver IC or a DVI signal; a signal that is restored by the LVDS receiver IC or a LVDS signal; a signal that is created by a special PCI card; an LCD signal that is outputted from a CPU that is installed in a PAD, mobile telephone or the like, or that is outputted from an LCD controller IC; a signal that is obtained as the result of the LCD control circuit 31 directly controlling the video RAM of a device such as a PAD or PC.

In synchronization with the control signal LP-CS that is generated by the LCD control circuit 31, the LCD power-supply circuit 33 generates and outputs a drive voltage for the source driver 22, a drive voltage for the gate driver 24 and a voltage Vcom for the opposing electrode 2 of the liquid crystal panel 1. In synchronization with the control signal BP-CS that is generated by the LCD control circuit 31, the backlight power-supply circuit 34 generates a voltage for lighting up the backlight 26, and performs ON/OFF control of the backlight 26.

In synchronization with the control signal SD-CS that is generated by the LCD control circuit 31, the source driver 22 obtains image data PD that is outputted from the LCD control circuit 31, and applies voltages that correspond to the image data PD to the data lines Dj of the liquid crystal panel 1. In synchronization with the control signal GD-CS that is generated by the LCD control circuit 31, the gate driver 24 applies an ON/OFF control voltage to the scan lines Li in order of line.

Figure 5:
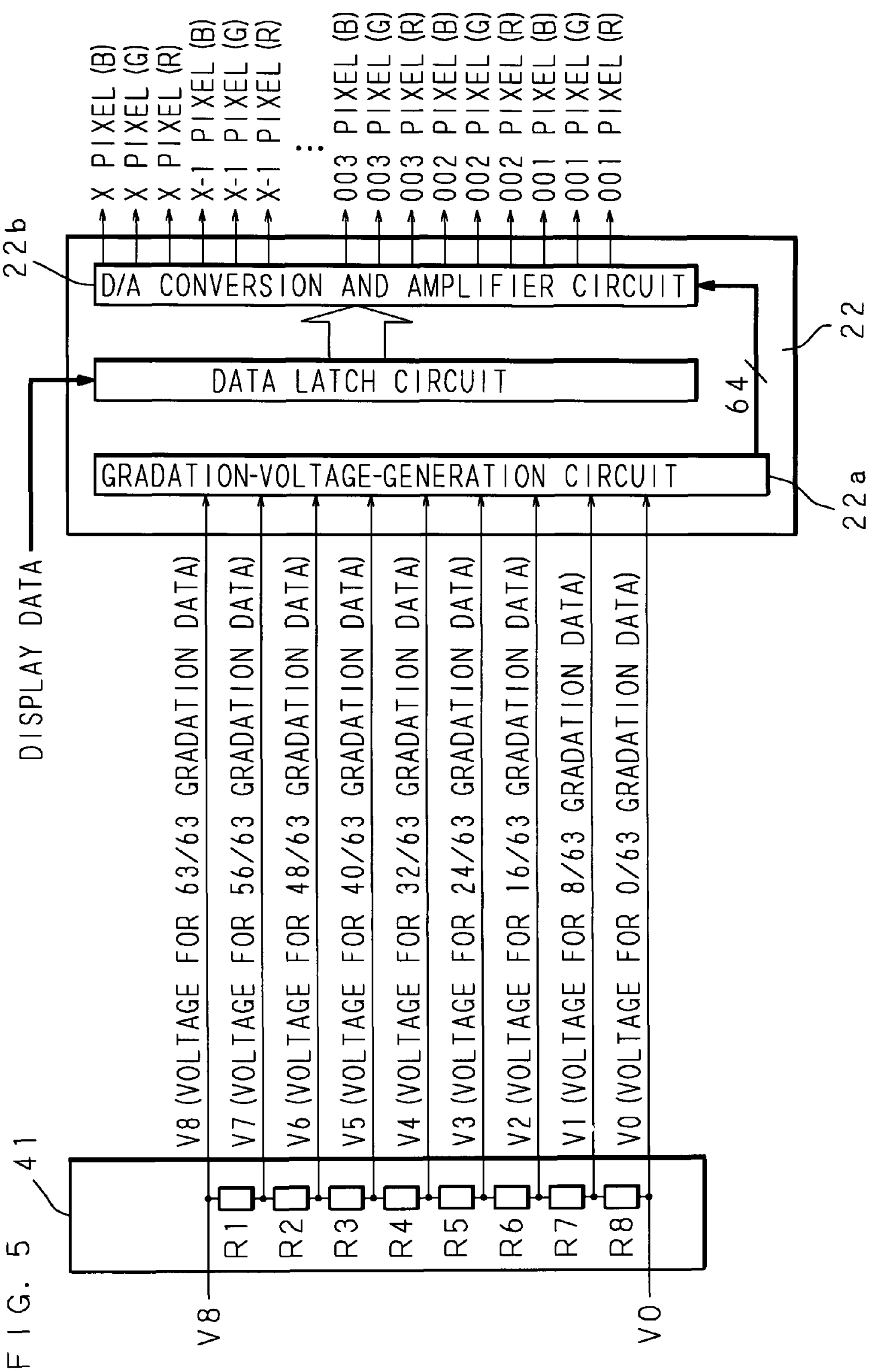
FIG. 5 is a drawing showing the construction of a source driver and gradation-reference-voltage-generation circuit.

FIG. 5 is a drawing showing the construction of the source driver 22 and the gradation-reference-voltage-generation circuit 41. As shown in FIG. 5, gradation reference voltages for 9 lines (V0 to V8) are inputted from the gradation-reference-voltage-generation circuit 41 to the source driver 22. The input gradation data that outputs the gradation reference voltages is: 0 gradations (V0), 8 gradations (V1), 16 gradations (V2), 24 gradations (V3), 32 gradations (V4), 40 gradations (V5), 48 gradations (V6), 56 gradations (V7) and 63 gradations (V8). The gradation-voltage-generation circuit 22*a* in the source driver 22 generates gradation voltages for all gradation data based on the gradation reference voltages V0 to V8 that are inputted from the gradation-reference-voltage-generation circuit 41. The voltages generated by the gradation-voltage-generation circuit 22*a* are outputted to the pixels from a D/A conversion and amplifier circuit 22*b* as gradation voltages.

Figure 13:
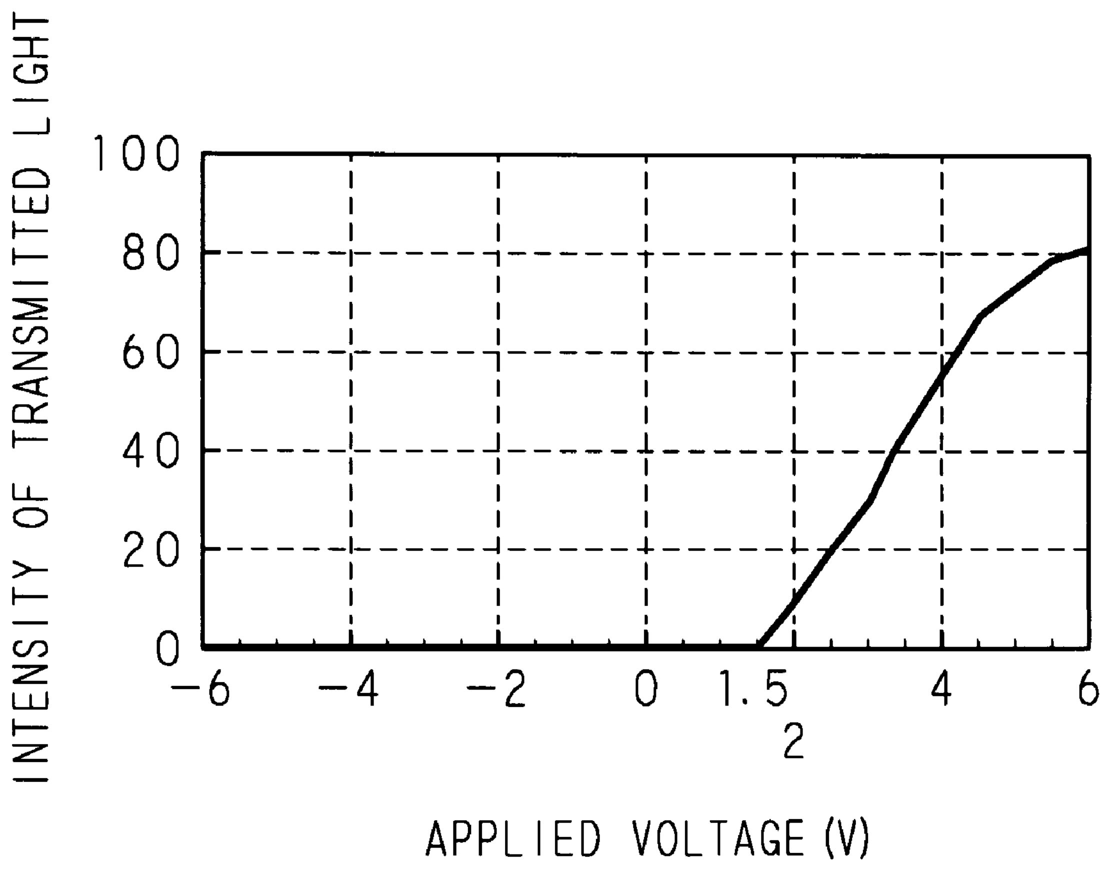
FIG. 13 is a graph showing the electro-optical characteristic of liquid crystal material.
Figure 14:
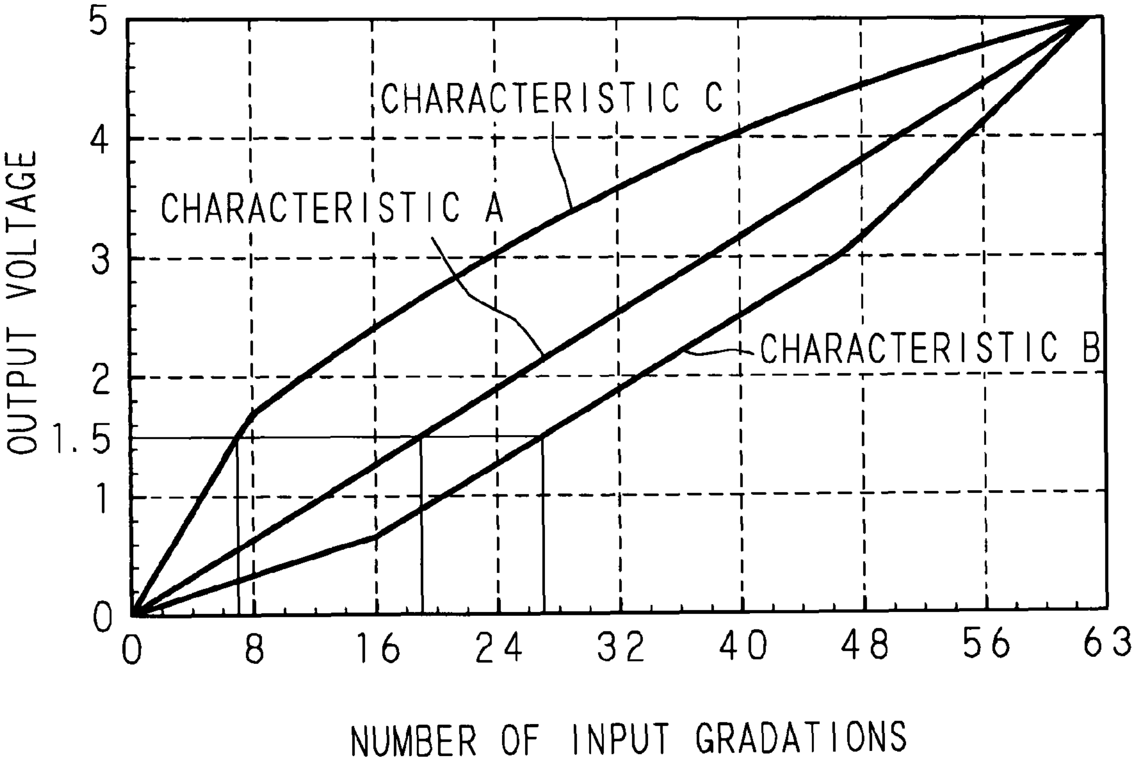
FIG. 14 is a graph showing the output characteristics of a source driver.

The gradation reference voltage V0 is determined according to the electro-optical characteristic of the filled liquid crystal material (ferroelectric liquid crystal) as shown in FIG. 13. A threshold voltage for which the optical characteristic of the liquid crystal material changes, or in other words, a threshold voltage at which transmitted light appears is found, and when the gradation reference voltage V0 is a display data voltage on the 0 gradation side, V0 is set to the threshold voltage. More specifically, in the example shown in FIG. 13, V0 is set to the threshold voltage 1.5V.

The gradation reference voltage V8 can be set to the maximum value for the operating voltage of the source driver 22 (for example, 5.0V), or can be set to V8=6.5V so that the data amplitude width becomes 5V. The remaining gradation reference voltages V1 to V7 are created by using resistances R1 to R8 to divide the resistance of gradation reference voltages V0 and V8.

When the gradation reference voltage V8 is display data voltage on the 0 gradation side, it is possible to reverse values for V0 and V8 in the example described above.

Figure 6:
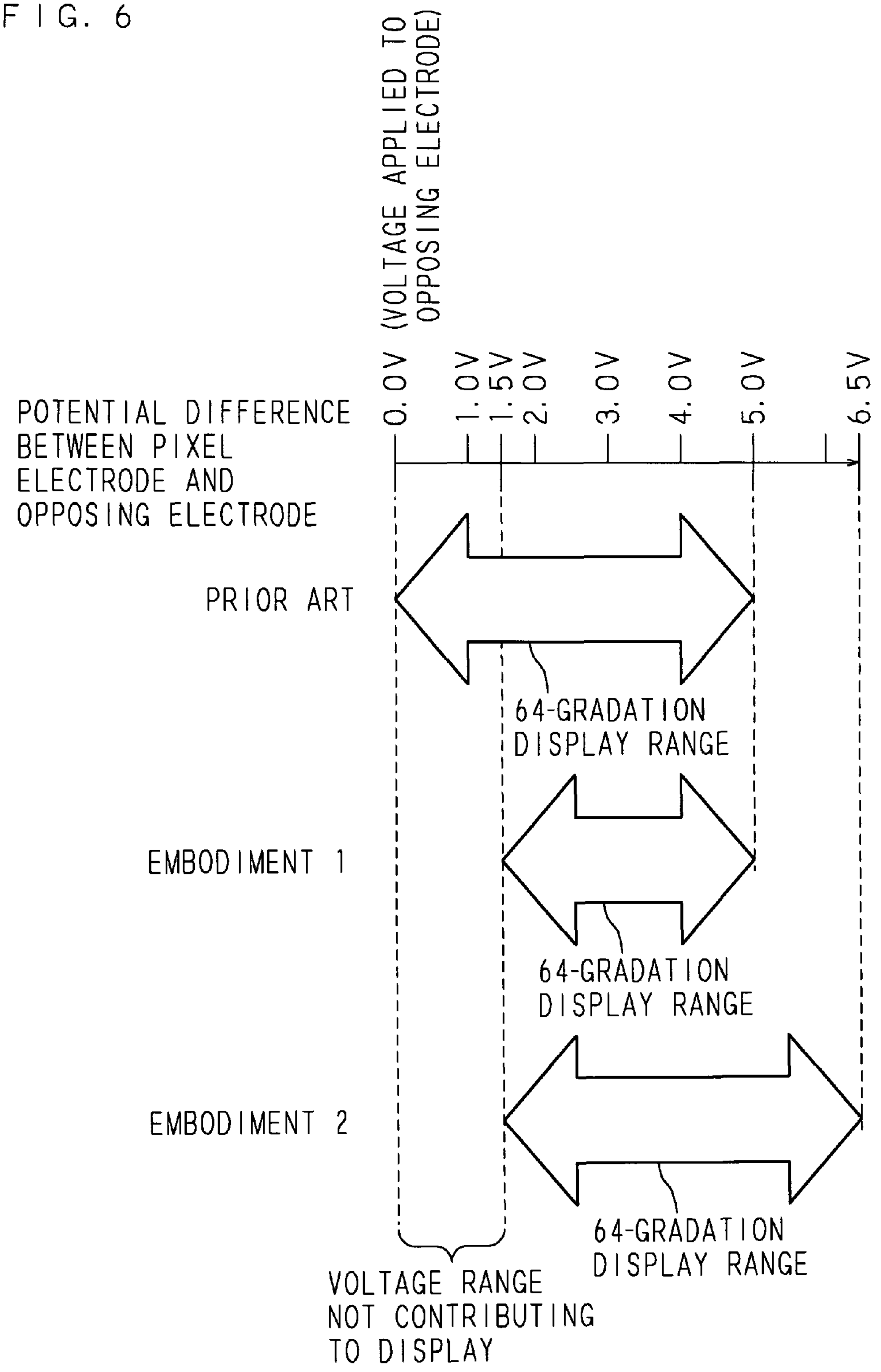
FIG. 6 is a drawing showing the relationship between the potential difference between the pixel electrodes and opposing electrode and 64-gradation display range.
Figure 15:
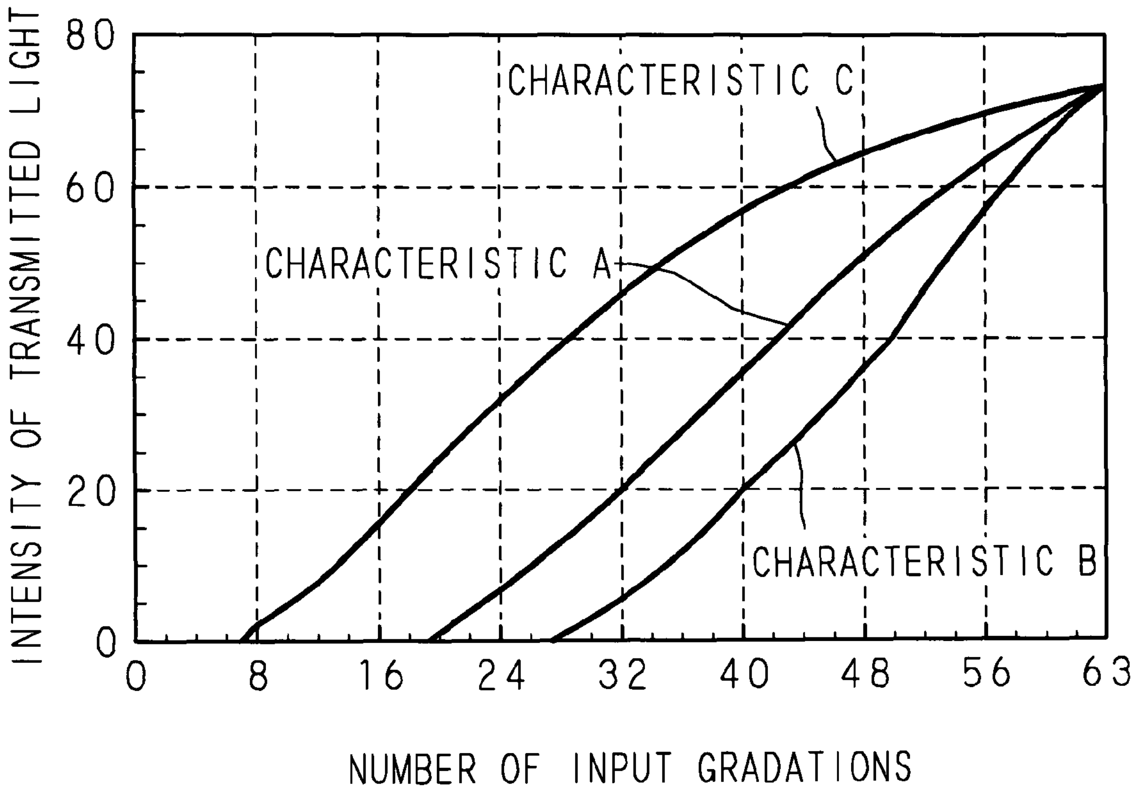
FIG. 15 is a graph showing the gradation characteristics of a prior liquid crystal display device.

FIG. 6 is a drawing showing the relationship between the potential difference between the pixel electrodes 5 and opposing electrode 2 and a 64-gradation display range. Normally, ground voltage (0V) is applied to the opposing electrode 2. Embodiment 1 shown in FIG. 6 is an example in which V8 is set to the maximum value for the operating voltage (0.5V), and Embodiment 2 is an example in which the data amplitude width is taken to be 5V. In the prior art, the potential difference between both electrodes, including 0V, is set, so there is a voltage range that does not contribute to the display, and there is gradation on the low-gradation side that cannot be displayed (see FIG. 15).

Figure 7:
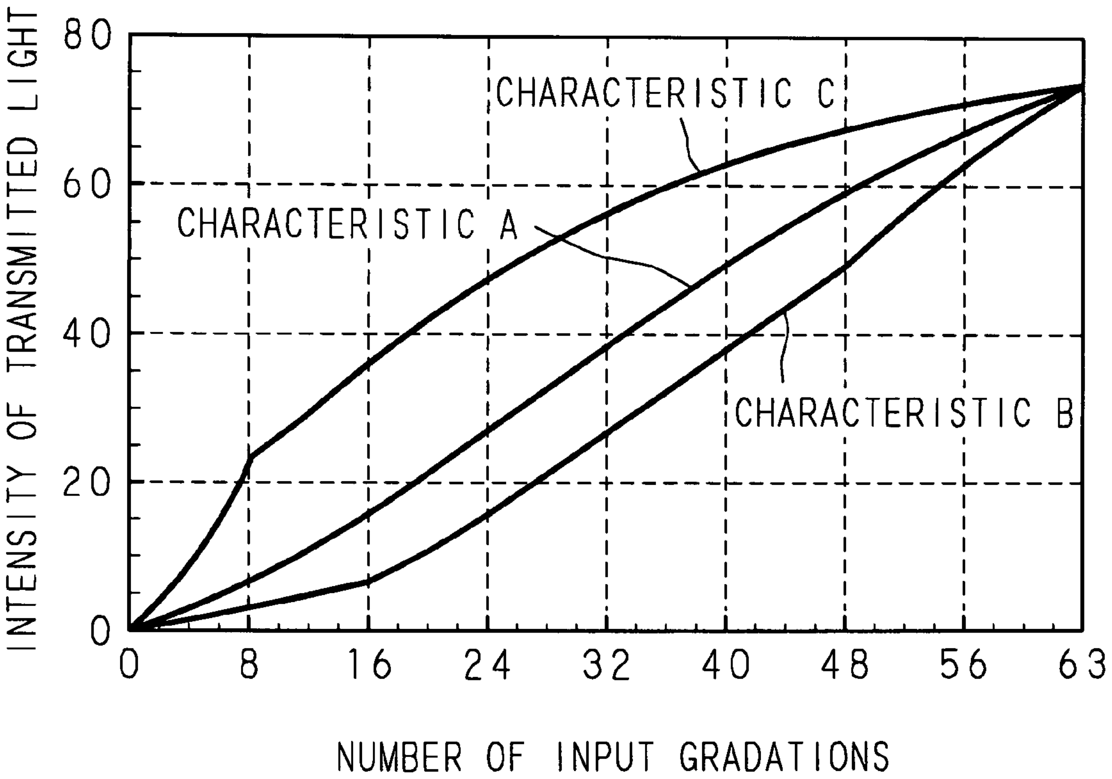
FIG. 7 is a graph showing the gradation characteristics of the liquid crystal display device of the present invention.

On the other hand, in Embodiments 1 and 2, the potential difference between both electrodes does not include 0V, or in other words, the potential difference is such that it becomes a voltage greater than the threshold voltage of the liquid crystal material (ferroelectric liquid crystal), so as shown in FIG. 7, it is possible to display an image covering all numbers of gradations including on the low-gradation side, and thus it is possible to improve the display characteristics.

Second Embodiment

Figure 8:
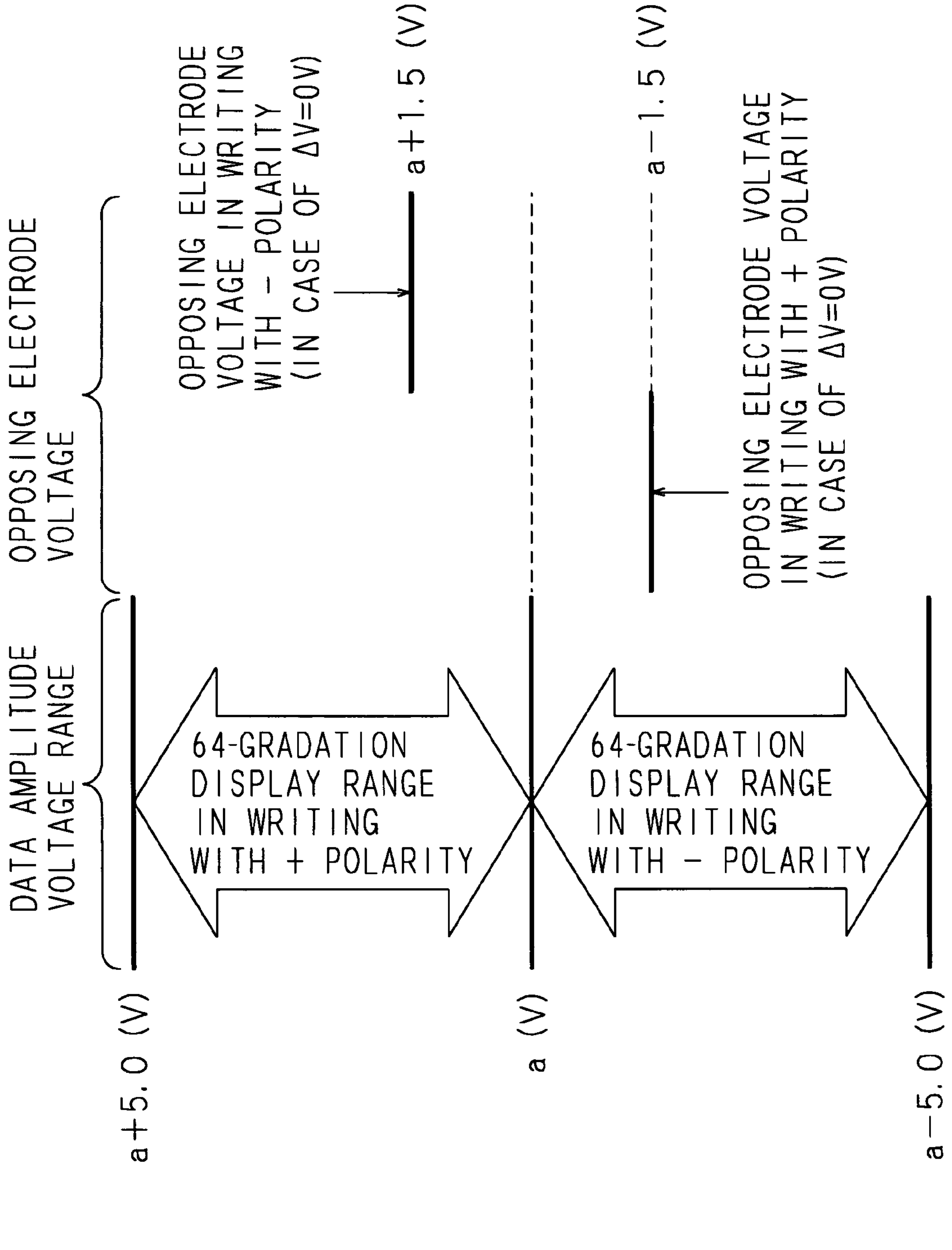
FIG. 8 is a drawing showing the voltage applied to the pixel electrodes and opposing electrode in a second embodiment of the present invention.

FIG. 8 is a drawing showing the voltage applied between the pixel electrodes 5 and the opposing electrode 2 in the second embodiment. Voltage within the range between the minimum output voltage having + polarity, and the maximum output voltage having – polarity of the output voltage from the source driver 22 is taken to be the reference voltage a(V). When display data is inputted to the source driver 22, voltage that corresponds to the number of gradations of that display data is outputted from the source driver 22 to each pixel. For example, when the amplitude of the output voltage from the source driver 22 is 0.5V, then as shown in FIG. 8, when there is + polarity output, voltage is outputted within the output voltage range of a(V) to a +5.0(V), and when there is – polarity output, voltage is outputted within the output voltage range of a –5.0(V) to a(V).

On the other hand, a voltage a –1.5(V) is applied to the opposing electrode 2 that faces the pixels for which + polarity writing is performed, and a voltage a +1.5(V) is applied to the opposing electrode 2 that faces the pixels for which – polarity writing is performed. By doing this, when there is either + polarity writing or – polarity writing, the potential difference between the opposing electrode 2 and pixel electrodes 5 becomes 1.5 to 6.5V, which is greater than the threshold voltage of the liquid crystal material (ferroelectric liquid crystal).

Here, when the entire surface of the opposing electrode 2 is at the same polarity, and when frame inverse driving is performed, then the entire surface of the opposing electrode 2 is taken to be a single electrode. When the polarity is the same and n-line frame inverse driving is performed, the opposing electrode 2 forms an electrode that is divided by each n line, and voltages of a +1.5(V) and a –1.5(V) are alternately applied. In the case of dot inverse driving and line inverse driving, the opposing electrode 2 is taken to have a zigzag alignment, and it is possible to apply a voltage of a +1.5(V) to one zigzag electrode, and to apply a voltage of a –1.5(V) to the other zigzag electrode.

With this kind of driving operation, display on the low-gradation side near a(V) is performed, and display on the high-gradation side near a ±5.0(V) is performed. Therefore, when writing display data, and when deleting display data, voltage greater than the threshold voltage of the liquid crystal material (ferroelectric liquid crystal) is applied between the opposing electrode 2 and pixel electrodes 5, so as shown in FIG. 7, it is possible to display an image over all numbers of gradations including the low-gradation side, and thus it is possible to improve the display characteristics.

Third Embodiment

Figure 9:
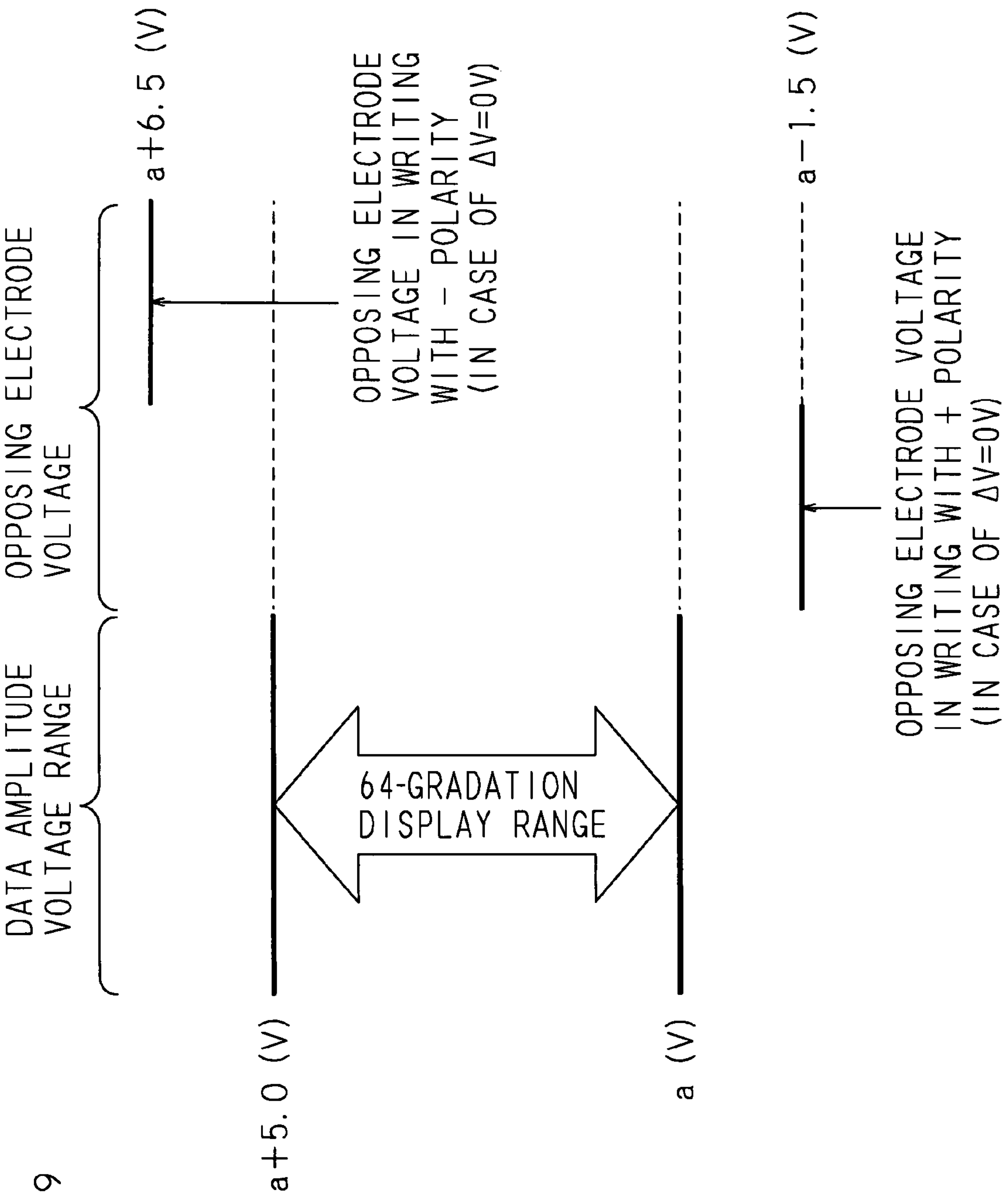
FIG. 9 is a drawing showing the voltage applied to the pixel electrodes and opposing electrode in a third embodiment of the present invention.

FIG. 9 is a drawing showing voltage that is applied between the pixel electrodes 5 and the opposing electrode 2 in the third embodiment. The minimum voltage of the output voltage of the source driver 22 is taken to be the reference voltage a(V). The amplitude of the voltage of the source driver 22 is taken to be 0.5V.

When writing display data using + polarity, the voltage Vcom for the opposing electrode 2 is taken to be a –1.5(V), and a voltage between the voltage a(V) on the low-gradation side and the voltage a +5.0(V) on the high-gradation side is applied from the source driver 22. When writing display data using – polarity, the voltage Vcom for the opposing electrode 2 is taken to be a +6.5(V), and a voltage between the voltage a +5.0(V) on the low-gradation side and the voltage a(V) on the high-gradation side is applied from the source driver 22. By doing this, when performing either + polarity writing or – polarity writing, the potential difference between the pixel electrodes 5 and the opposing electrode 2 becomes 1.5 to 6.5V, which is greater than the threshold voltage of the liquid crystal material (ferroelectric liquid crystal).

With this kind of drive operation, display is performed on the low-gradation side near a(V), and display is performed on the high-gradation side at a +5.0(V). Therefore, when writing display data, and when deleting display data, a voltage that is greater than the threshold voltage of the liquid crystal material (ferroelectric liquid crystal) is applied between the opposing electrode 2 and pixel electrodes 5, so as shown in FIG. 7, it is possible to display an image over all gradation numbers including the low-gradation side, and thus it is possible to improve the display characteristics.

Fourth Embodiment

Figure 10:
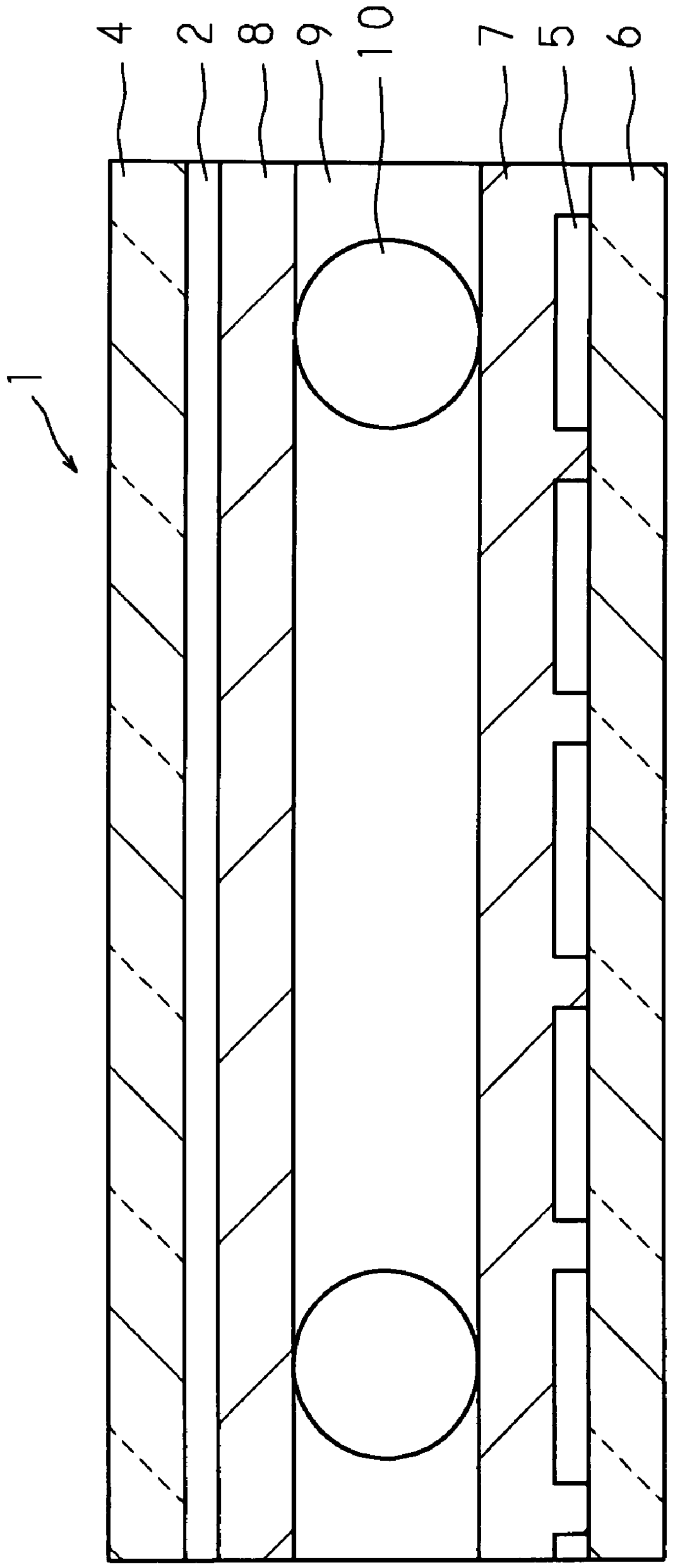
FIG. 10 is a cross-sectional drawing of a liquid crystal panel.
Figure 11:
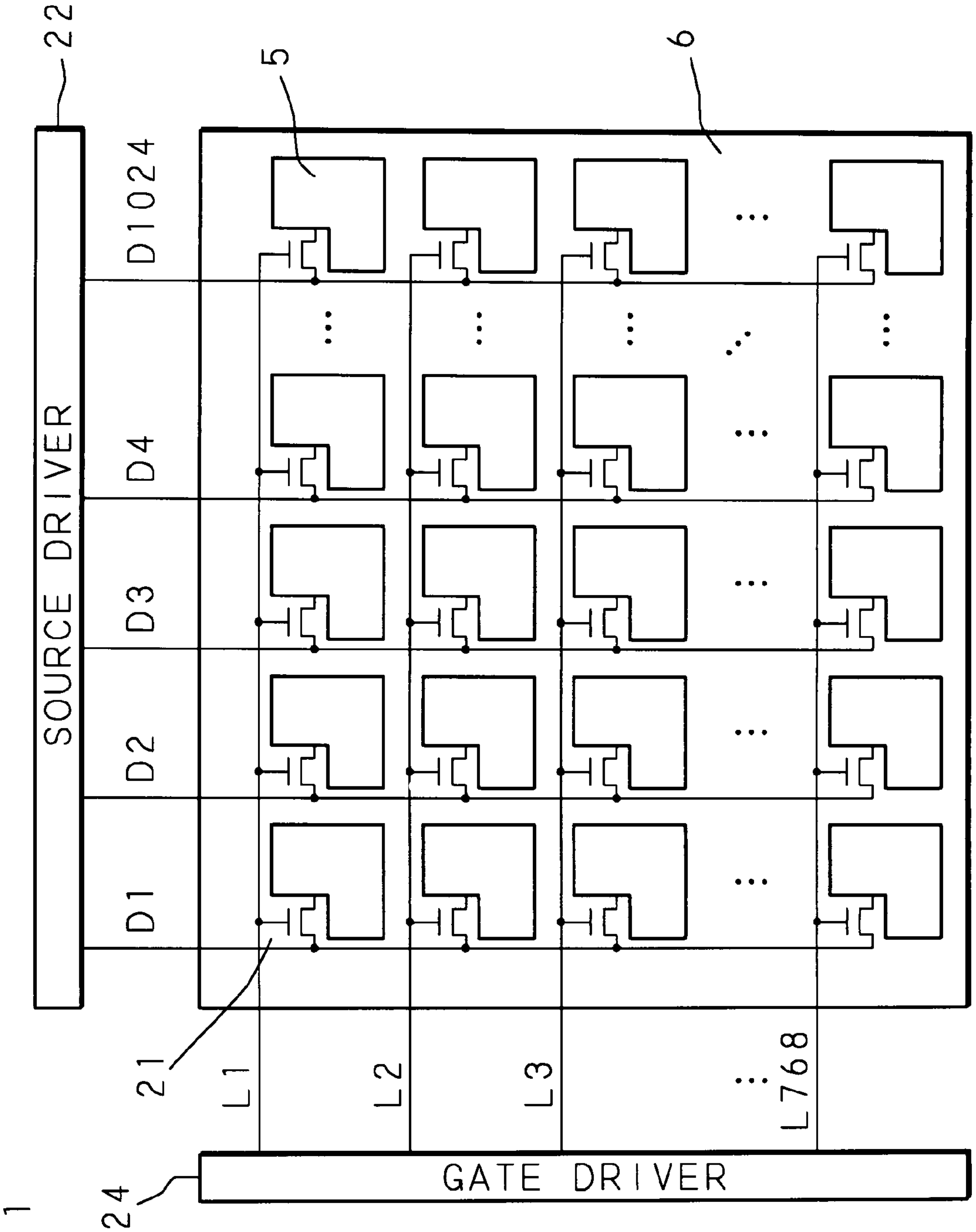
FIG. 11 is a top view of a liquid crystal panel.
Figure 12:
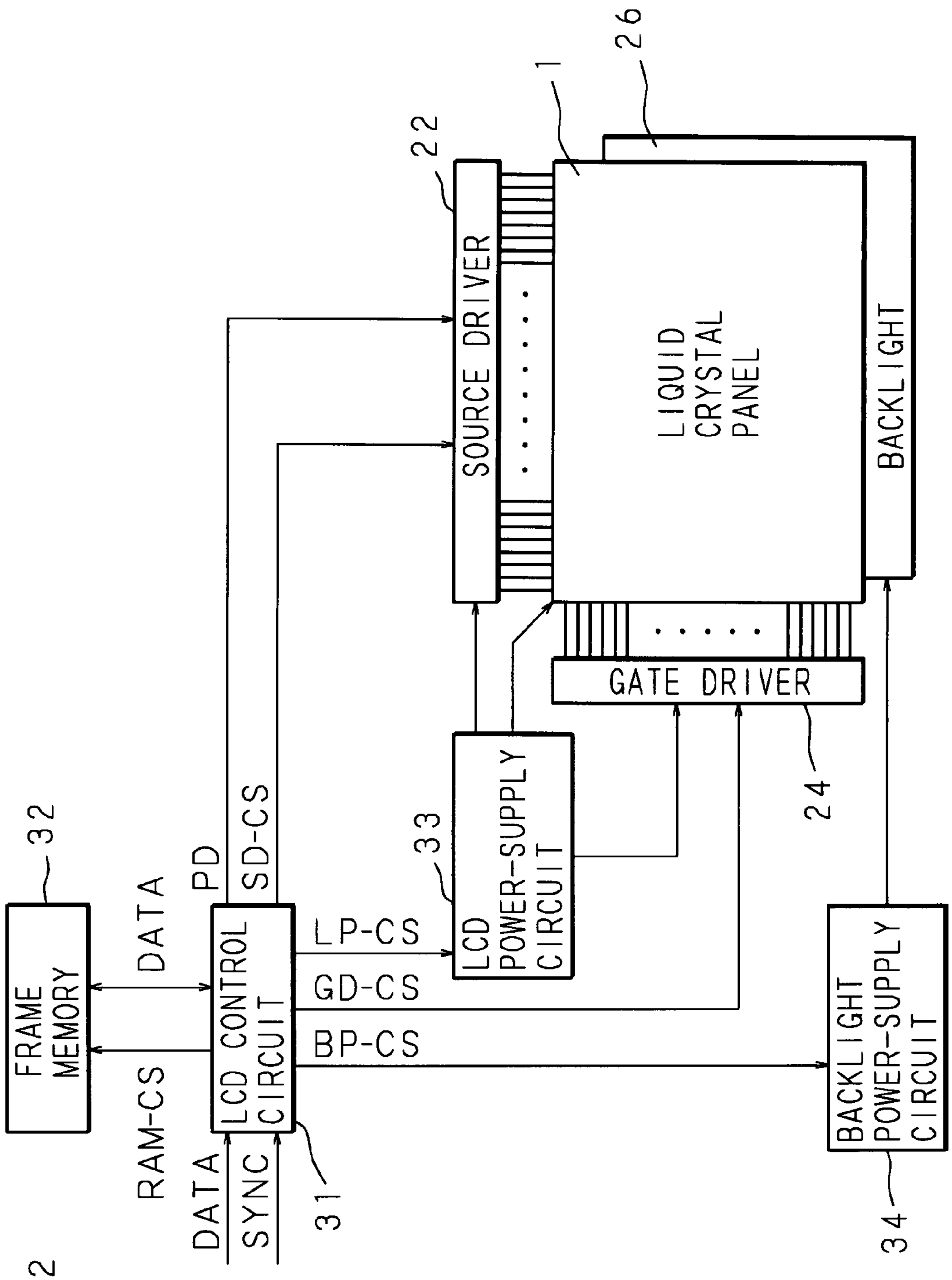
FIG. 12 is a block diagram showing the overall construction of a liquid crystal display device.

FIG. 10 is a cross-sectional drawing showing the construction of a liquid crystal panel 1, FIG. 11 is a top view of a liquid crystal panel 1, and FIG. 12 is a block diagram showing the overall construction of a liquid crystal display device. In FIG. 10 to FIG. 12, the same numbers are used for parts that are the same or similar to those shown in FIG. 1 to FIG. 4. This fourth embodiment is a liquid crystal display device comprising a backlight 26 that lights up each of the RGB colors, and performs color display without the use of color filters.

As can be seen in FIG. 10, the liquid crystal panel 1 comprises: a glass substrate 6 having pixel electrodes 5 that are arranged in a matrix shape (for example, 0.24×0.24 $mm^2$, number of pixels 1024 H×768 V, 12.1 inches diagonal) and TFTs 21 that are connected to pixel electrodes 5 respectively; and a glass substrate 4 having an opposing electrode 2. An oriented film 7 and oriented film 8 are placed on top of the pixel electrodes 5 and opposing electrode 2, and the glass substrate 6 and glass substrate 4 are arranged so that these oriented films 7, 8 face each other. A liquid crystal layer 9 that is filled with a ferroelectric liquid crystal is formed in the space that is formed by distributing spacers 10 for maintaining a uniform gap between the oriented film 7 and oriented film 8. As in the case of the first embodiment, this liquid crystal panel 1 is held between two polarization plates, polarization plate 11 and polarization plate 12 (see FIG. 2), and underneath it, there is the backlight 26 having an RGB light source.

The pixel electrodes 5 and TFTs 21 are arranged in a matrix shape on the glass substrate 6 (for example, 1240 H×768 V), and each of the pixel electrodes 5 is connected to the drain terminal of TFT 21. The gate terminals of the TFTs 21 are connected to scan lines Li (I=1, 2, 3, . . . , 768) that are connected in order to the output stage of a gate driver 24, and the source terminals of the TFTs 21 are connected to data lines Dj (j=1, 2, 3, . . . , 1024) that are connected in order to the output stage of a source driver 22. The operation of the image display, which is performed according to light transmission control of the liquid crystal that uses the source driver 22, gate driver 24 and TFTs 21, is the same as that of the first embodiment.

As shown in FIG. 12, in addition to this kind of source driver 22 and gate driver 24, the liquid crystal display device comprises peripheral circuits such as a LCD control circuit 31, frame memory 32, LCD power-supply circuit 33, and backlight power-supply circuit 34.

After a synchronization signal SYNC is inputted, the LCD control circuit 31 generates a control signal RAM-CS that is necessary for controlling the input/output timing of display data stored in the frame memory 32, and outputs the generated control signal RAM-CS to the frame memory 32. In synchronization with the control signal RAM-CS that is generated by the LCD control circuit 31, the frame memory 32 stores data DATA that is obtained by the LCD control circuit 31, or outputs stored display data DATA to the LCD control circuit 31. The frame memory 32 can be contained on the IC in the LCD control circuit 31.

In synchronization with the inputted synchronization signal SYNC, the LCD control circuit 31 obtains input display data DATA, stores the obtained display data DATA in the frame memory 32, reads stored display data DATA from the frame memory 32, and outputs image data PD that is to be displayed on the liquid crystal panel 1 to the source driver 22. The operation after that is the same as that of the first embodiment.

Even in this kind of field sequential type of liquid crystal display device, by obtaining a threshold voltage from the electro-optical characteristic of the ferroelectric liquid crystal used as shown in FIG. 13, and performing the kind of voltage control as described in the first through the third embodiments based on the obtained threshold voltage, it becomes possible to perform display on the low-gradation side, and as shown in FIG. 7, it is possible to display an image over all gradation numbers including the low-gradation side, thus it is possible to improve the display characteristics.

Not only can the liquid crystal display device of this invention, having improved display characteristics as described above, be used in desktop type liquid crystal displays, liquid crystal displays used in notebook type personal computers, liquid crystal displays used in PADs or mobile telephones, liquid crystal displays used in game machines, and liquid crystal displays for home use or mobile televisions, but can also be used in viewfinders or monitors of video cameras or digital cameras, car navigation devices, or display devices such as that of a POS terminal.

In the embodiments described above, the case of using ferroelectric liquid crystal as the liquid crystal material is explained, however, of course the invention can also be applied to the case in which anti-ferroelectric liquid crystal having spontaneous polarization is used.

What is claimed is:

1. A drive method for driving a liquid crystal display device that is formed by filling a liquid crystal material having spontaneous polarization between first electrodes that are formed on one substrate and a second electrode that is formed on another substrate, and that has switching elements on the one substrate that correspond to a plurality of pixels respectively, comprising the steps of:

obtaining a threshold voltage at which a transmitted light intensity of the liquid crystal material becomes 0;

controlling the voltage applied to the liquid crystal material by the switching elements; and applying a voltage of display data between the first electrodes and second electrode for writing display data;

wherein a range of the voltage applied for writing display data excludes a voltage equal to and a voltage less than the obtained threshold voltage.

2. The drive method for a liquid crystal display device according to claim 1, further comprising a step of:

when writing display data, setting the second electrode to be at ground potential and applying a voltage that is greater than the threshold voltage to the first electrodes.

3. The drive method for a liquid crystal display device according to claim 1, further comprising a step of:

when writing display data, applying a voltage that is within a specified range to the first electrodes and applying a fixed voltage that is set according to the specified range and the threshold voltage to the second electrode.

4. A drive method for driving a liquid crystal display device that is formed by filling a liquid crystal material having spontaneous polarization between first electrodes that are formed on one substrate and a second electrode that is formed on another substrate, and that has switching elements on the one substrate that correspond to a plurality of pixels respectively, comprising steps of:

obtaining a threshold voltage at which a transmitted light intensity of the liquid crystal material becomes 0;

controlling the voltage applied to the liquid crystal material by the switching elements; and applying a voltage of display data between the first electrodes and second electrode for deleting display data;

wherein a range of the voltage applied for writing display data excludes a voltage equal to and a voltage less than the obtained threshold voltage.

5. The drive method for a liquid crystal display device according to claim 4, further comprising a step of:

when deleting display data, setting the second electrode to be at ground potential and applying a voltage that is greater than the threshold voltage to the first electrodes.

6. The drive method for a liquid crystal display device according to claim 4, further comprising a step of:

when deleting display data, applying a voltage that is within a specified range to the first electrodes and applying a fixed voltage that is set according to the specified range and the threshold voltage to the second electrode.

7. A liquid crystal display device, comprising:

a liquid crystal material having spontaneous polarization and a threshold voltage at which a transmitted light intensity of the liquid crystal material becomes 0, said liquid crystal material being filled in a space between first electrodes formed on one substrate and a second electrode formed on the other substrate;

switching elements disposed on the one substrate which control a voltage applied to the liquid crystal material corresponding to a plurality of pixels respectively; and a voltage application unit which applies a voltage corresponding to display data between the first electrodes and second electrode so as to write the display data;

wherein a range of the voltage applied for writing display data excludes a voltage equal to and a voltage less than the threshold voltage.

8. The liquid crystal display device according to claim 7, wherein color display is performed by using a color filter method.

9. The liquid crystal display device according to claim 7, wherein color display is performed by using a field sequential method.

10. A liquid crystal display device, comprising:

a liquid crystal material having spontaneous polarization and a threshold voltage at which a transmitted light intensity of the liquid crystal material becomes 0, said liquid crystal material being filled in a space between first electrodes formed on one substrate and a second electrode formed on the other substrate;

switching elements disposed on the one substrate which control a voltage applied to the liquid crystal material corresponding to a plurality of pixels respectively; and a voltage application unit which applies a voltage corresponding to display data between the first electrodes and second electrode so as to delete the display data;

wherein a range of the voltage applied for writing display data excludes a voltage equal to and a voltage less than the threshold voltage.

11. The liquid crystal display device according to claim 10, wherein color display is performed by using a color filter method.

12. The liquid crystal display device according to claim 10, wherein color display is performed by using a field sequential method.

* * * * *